(12) United States Patent
Henry et al.

(10) Patent No.: US 9,154,827 B2
(45) Date of Patent: Oct. 6, 2015

(54) METHOD AND DEVICE FOR RECEPTION OF CONTROL WORDS, AND DEVICE FOR TRANSMISSION THEREOF

(75) Inventors: Jean-Baptiste Henry, Melesse (FR); Alain Durand, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 399 days.

(21) Appl. No.: 13/138,123

(22) PCT Filed: Jan. 8, 2010

(86) PCT No.: PCT/EP2010/050164
§ 371 (c)(1),
(2), (4) Date: Sep. 23, 2011

(87) PCT Pub. No.: WO2010/079219
PCT Pub. Date: Jul. 15, 2010

(65) Prior Publication Data
US 2012/0014522 A1  Jan. 19, 2012

(30) Foreign Application Priority Data

Jan. 12, 2009 (EP) ..................................... 09305027
Feb. 12, 2009 (EP) ..................................... 09305134

(51) Int. Cl.
*H04N 7/167* (2011.01)
*H04N 21/418* (2011.01)
(Continued)

(52) U.S. Cl.
CPC ......... *H04N 21/4181* (2013.01); *H04N 7/1675* (2013.01); *H04N 21/26606* (2013.01);
(Continued)

(58) Field of Classification Search
None
See application file for complete search history.

(56) References Cited

U.S. PATENT DOCUMENTS

| 2002/0191789 A1 | 12/2002 | Kudelski et al. | |
| 2003/0005435 A1* | 1/2003 | Nelger et al. | 725/31 |

(Continued)

FOREIGN PATENT DOCUMENTS

| CA | 2103935 | 2/1994 |
| CA | 2397211 | 8/2001 |

(Continued)

OTHER PUBLICATIONS

D. Diaz-Sanchez etal: "Sharing Conditional Access Modules through the home network", Comsumer Electronics, 2009,IEEE,Jan. 10, 2009,pp. 1-2.

(Continued)

*Primary Examiner* — Brandon Hoffman
(74) *Attorney, Agent, or Firm* — Myers Wolin LLC

(57) ABSTRACT

Delivery of conditional access data to a receiver that is able to connect to a plurality of scrambled programs. Conditional access for a current channel is handled using standard ECMs delivered with the channel. In parallel, the receiver retrieves an ECM for a separate stream comprising control words for every channel. The control word of this ECM is used to descramble the separate stream to access the control words for every channel. In a preferred embodiment, these control words are super-encrypted using channel keys and the receiver is only able to obtain channel keys for channels for which it has access rights. In case the control words are super-encrypted, they are decrypted. Upon channel change, the relevant retrieved control word is used to descramble the new channel. Also provided is a receiver device and a transmitter device. According to a variant, the control words received in the separate stream is treated only upon a change of channel. The invention enables a reduction or removal of the CA delay when switching between channels.

11 Claims, 3 Drawing Sheets

(51) Int. Cl.
*H04N 21/266* (2011.01)
*H04N 21/438* (2011.01)
*H04N 21/4405* (2011.01)
*H04N 21/4623* (2011.01)
*H04N 21/61* (2011.01)
*H04N 21/6334* (2011.01)
*H04N 21/643* (2011.01)

(52) U.S. Cl.
CPC ....... *H04N21/4384* (2013.01); *H04N 21/4405* (2013.01); *H04N 21/4623* (2013.01); *H04N 21/6125* (2013.01); *H04N 21/63345* (2013.01); *H04N 21/64322* (2013.01)

(56) References Cited

U.S. PATENT DOCUMENTS

| | | | |
|---|---|---|---|
| 2003/0048808 A1 | 3/2003 | Stahl et al. | |
| 2004/0120581 A1 | 6/2004 | Ozer et al. | |
| 2005/0201559 A1* | 9/2005 | Van Der Heijden | 380/239 |
| 2006/0143448 A1 | 6/2006 | Moroney | |
| 2006/0229992 A1 | 10/2006 | Morten et al. | |
| 2008/0037782 A1 | 2/2008 | Morten | |
| 2008/0118153 A1 | 5/2008 | Wu et al. | |

FOREIGN PATENT DOCUMENTS

| | | |
|---|---|---|
| CA | 2455378 | 8/2004 |
| CN | 101267532 | 9/2008 |
| EP | 1447983 | 8/2004 |
| EP | 1705915 | 9/2006 |
| EP | 1742475 | 1/2007 |
| EP | 2048890 | 10/2009 |
| JP | 2000101984 | 4/2000 |
| JP | 2002530020 | 9/2002 |
| KR | 2006111824 | 10/2006 |
| WO | WO0028742 | 5/2000 |
| WO | WO2004082286 | 9/2004 |
| WO | WO2004114668 | 12/2004 |
| WO | WO2006004804 | 1/2006 |
| WO | WO2006/048043 | 5/2006 |
| WO | WO 2007/132165 | 11/2007 |

OTHER PUBLICATIONS

Search Report dated Mar. 16, 2010.

* cited by examiner

METHOD AND DEVICE FOR RECEPTION OF CONTROL WORDS, AND DEVICE FOR TRANSMISSION THEREOF

This application claims the benefit, under 35 U.S.C. §365 of International Application PCT/EP2010/050164, filed Jan. 8, 2010, which was published in accordance with PCT Article 21(2) on Jul. 15, 2010 in English and which claims the benefit of European patent application No. 09305027.6, filed on Jan. 12, 2009 and European patent application No. 09305134.0, filed on Feb. 12, 2009.

FIELD OF THE INVENTION

The present invention relates generally to conditional access television, and in particular to delivery of conditional access messages to conditional access television receivers.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

An important aspect for the quality of experience perceived by an end-user watching television is the time needed to change channel (i.e. the zapping time). Naturally, the longer the end-user has to wait to access a new channel, the worse the experience is. However, contrary to what may be believed, despite—or perhaps because of—the technological advances, the zapping time is practically worse than ever.

In the early days of television, all that was needed to change channel was to turn or press a button, something that may be done very rapidly. Nowadays, though, the zapping time has become much longer, more for some technologies than for others. This is due to the accumulation of a number of small delays, each delay often being a side-effect of other, usually beneficial technical developments. Such delays comprise:
- remote control transmission;
- connection to the transport stream;
- buffering of the incoming data;
- Conditional Access (CA) system delays, such as acquisition of CA data and descrambler programming;
- the time needed to find a first decodable image, such as a so-called I image for MPEG; and
- audio synchronization.

Technologies exist to reduce some of these delays, but the CA system has not been adequately addressed yet. The CA system can delay the channel change by up to one second. This delay is needed to acquire the CA data, decrypt it and program the descrambler. In many systems, the CA data is an Entitlement Control Message (ECM) that comprises an encrypted control word that the descrambler needs to access a scrambled program correctly.

FIG. 1 schematically illustrates a typical prior art CA system at the receiver end. The description is quite simplified and only describes features necessary for understanding the present invention. The receiver end 100 comprises a set-top box 110 that is connected to some kind of means for receiving 120, such as for example a parabolic antenna (as illustrated) or a cable. The set-top box 110 comprises a descrambler 140 and is also functionally connected to a security module 130, such as a detachable smartcard.

The receiving means 120 receives a scrambled program and encrypted ECMs for the scrambled program, each ECM comprising information enabling descrambling of the program during a time period called cryptoperiod (and possibly also during the subsequent cryptoperiod). The ECMs are sent 1 to the security module 130 and the scrambled program is sent 3 to the descrambler 140. The security module 130 decrypts the ECMs and forwards 2 extracted control words to the descrambler 140 that uses these to descramble the scrambled program so as to output 4 a program in the clear.

Often, the control word is changed about every 10 seconds, which means that the corresponding ECMs must be received so as to keep up. It is also common for an ECM to embed two control words, one for the current so-called crypto-period and one for the next. This provides some respite for the handling of the ECMs.

However, upon change of channel, the proper control word is not available as the ECMs are received only for the current channel. Thus, for a new channel, the set-top box usually has to wait for ECM extraction and decryption to occur before being able to descramble the program. This typically takes between 300 ms and 1 s, with 500 ms being a rough average value.

This delay may be better understood if it is known that that the security module and the set-top box have to perform a plurality of actions. The security module has to receive the ECM, decrypt the ECM, check the integrity of the ECM, verify the rights included in the ECM (e.g. verification the user has subscribed to the channel), encrypt and integrity protect the control word using a key shared with the set-top box, and send the protected control word to the set-top box. The set-top box has to extract the ECM (one ECM is typically present every 10 ms in the stream), send the ECM to the security module, receive the encrypted control word, decrypt the encrypted control word and verify the integrity of the control word.

In many current systems, this CA delay often does not cause any extra delays during zapping. The reason for this is shown in FIG. 2 that illustrates the commonly expected delays for the steps necessary to display a program after a change of channel in an exemplary Internet TV (IPTV) system.

After a channel change, 700 ms are needed for setting up the multicast. Only then can the buffering and the wait for the start of the Group Of Pictures (GOP) begin, which is performed in parallel with the reception of an ECM and extraction of the control word. When an I-Frame has been found, the hardware may descramble the scrambled program, which takes 100 ms, after which the MPEG4 decoding and display of the program takes another 700 ms. As can be seen from FIG. 2, the delay until the start of the GOP is expected to be 1000 ms, while the CA delay usually is shorter than that, such as an exemplary 500 ms. As these delays occur in parallel, it will be appreciated that the CA delay does not introduce any extra delay.

However, some solutions—such as for example those found in US 2003/0048808 and WO 2004/114668—reduce the duration of the delay for the GOP start so that it is shorter than the CA delay, while the solution described in European Patent Application 07301453.2 reduces the buffering delay.

It will thus be appreciated that there is a need for solutions that reduce the CA delay, in particular upon a channel change.

JP 2000101984 teaches a system in which the set-top box receives, from the transport stream, the ECM of all the channels for which the user has a subscription. The received ECMs are then stored. Thus, upon zapping, the set-top box immediately has the right ECM and can send it to the smart card for decryption. However, with such a solution, the CA delay is only marginally decreased. Typically, in a MPEG2-stream, an ECM is present every 10 ms. Thus, ECM extraction time is almost negligible compared with ECM decryption time.

As a variant in JP200101984 the ECMs are received by the smartcard that decrypts them. Only control words returned by the smartcard are stored by set-top box. This variant has one major drawback: since the ECM decryption time is typically between 300 ms and 1 second and cryptoperiods typically last 10 seconds (i.e. new ECMs every 10 s), the solution does not scale very well when it comes to the number of subscribed channels. If a bouquet includes more than 20 or 30 channels, the solution disclosed by JP200101984 cannot be applied, as the smartcard does not have the time to decrypt all the ECMs.

It can thus be appreciated that there is a need for an alternative solution that can enable reduction of the conditional access delay. The present invention provides such a solution, with a number of variants.

SUMMARY OF THE INVENTION

In a first aspect, the invention is directed to a method for reception of control words, each control word being usable to decrypt a separate content channel. A receiver receives a stream of control words on a channel distinct from the content channels, the stream of control words being encrypted using a stream key, and decrypts the stream of control words using the stream key to obtain the control words.

In a first preferred embodiment, a control word is further encrypted using a channel key, the channel key being specific to a content channel that the control word can decrypt or to a bouquet to which such a channel belong. The receiver decrypts the control word using the channel key. In a first variant, the channel key is received in a message, which may be decrypted only if the receiver has a subscription to the channel or the bouquet and the receiver decrypts the message to obtain the channel key. In a second variant, the channel key is received in a message destined for and decryptable only by a specific user and the receiver decrypts the message to obtain the channel key.

In a second preferred embodiment, the stream key for a content channel that the receiver accesses is retrieved from an Entitlement Control Message delivered in the content channel or the stream of control words.

In a second aspect, the invention is directed to a device for receiving control words, each control word being usable to decrypt a separate content channel. The device comprises means for receiving a stream of control words on a channel distinct from the content channels, the stream of control words being encrypted using a stream key; and means for decrypting the stream of control words using the stream key to obtain the control words.

In a first preferred embodiment, a control word is further encrypted using a channel key, the channel key being specific to a content channel that the control word can decrypt or to a bouquet to which such a channel belong, and the decryption means is further for decrypting the control word using the channel key. In a first variant, the reception means is further for receiving the channel key in a message, which may be decrypted only if the receiver has a subscription to the channel or the bouquet; and the decryption means is further for decrypting the message to obtain the channel key. In a second variant, the reception means is further for receiving the channel key in a message destined for and decryptable only by a specific user; and the decryption means is further for decrypting the message to obtain the channel key.

In a third aspect, the invention is directed to a device for transmission of control words, each control word being usable to decrypt a separate content channel. The device comprises means for encrypting a stream of control words using a stream key; and means for transmitting the encrypted stream of control words, the stream of control words being distinct from the content channels.

BRIEF DESCRIPTION OF THE DRAWINGS

Preferred features of the present invention will now be described, by way of non-limiting example, with reference to the accompanying drawings, in which.

Figure 1:
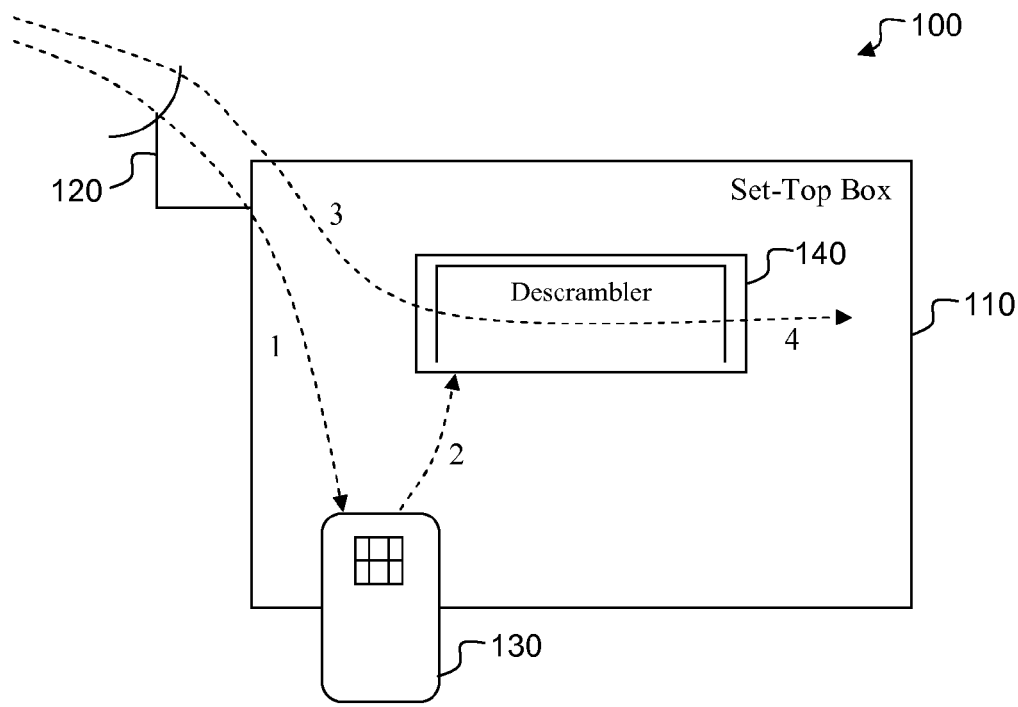
FIG. 1, already discussed, schematically illustrates a typical prior art CA system at the receiver end.
Figure 2:
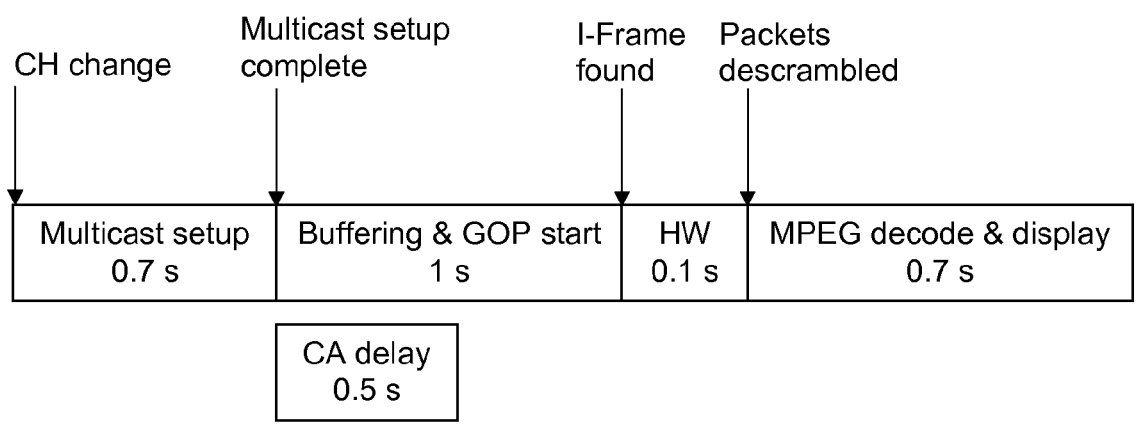
FIG. 2, already discussed, illustrates expected delays for the steps necessary to display a program after a change of channel in an exemplary Internet TV (IPTV) system.

In the Figures, the represented blocks are purely functional entities, which do not necessarily correspond to physically separate entities. These functional entities may be implemented as hardware, software, or a combination of software and hardware; furthermore, they may be implemented in one or more integrated circuits.

PREFERRED EMBODIMENT OF THE INVENTION

The present invention is suitably applied to conditional access (CA) Internet TV (IPTV) that will be used hereinafter as a non-limitative example. It will however be appreciated that it may also be used in other suitable conditional access television systems, such as classic broadcast systems, to reduce the CA delay, especially at channel changes. In this non-limitative example, the conditional access television receiver is a set-top box (STB), but it will be appreciated that the invention also is applicable to other kinds of receivers such as computers and mobile communicators (e.g. mobile phones).

In an IPTV system, the transport layer offers other channels apart from that carrying the IPTV stream. The present invention uses such an "out-of-band" channel (also called back channel or side channel) to carry the CA data in one or more messages. Hence the STB may acquire the CA data in advance or very quickly and can be able to program the descrambler with the correct control word practically immediately when zapping on CA-enabled channels.

It is important to remember that the STB generally does not know to what channel the user will zap to. Of course, heuristics can be developed to guess to which channel the user will zap (the most obvious example is the P+ key pressed several times), but no heuristic is infallible. So ideally the STB has to be aware of control words of all CA-protected channels it has access to, which can be a lot. As these control words are updated regularly, the STB also has to keep the information up-to-date.

It should also be noted that ECMs for the current program can always be sent in-band of the IPTV service. These ECMs are advantageously prioritised since they are used to decode the current program.

According to the present invention, a Secure Authenticated Channel (SAC) is established on the side channel between the IPTV delivery service and a security module of the STB, and CA data is sent over the established SAC. This allows a reduction of the time needed by the smart card to analyse the ECM, while the security level may be kept high. In the preferred embodiment, the security module is a removable smartcard inserted in the STB, but it will be appreciated that the security module also may be otherwise embodied, such as for example as hardware and/or software of the STB itself.

The SAC is advantageously established beforehand so that its establishment does not add any delay. The SAC may be established as follows, using any suitable prior art method, Directly between the security module and the head-end using a back channel, advantageously the one described in WO 2006/04804.

Using the existing key infrastructure between the security module and the head-end (i.e. usage of the keys used to decrypt ECMs). It will be appreciated that this enables the invention to be used not only for IPTV and the like, but also in a "classical" broadcast system.

If the establishment is successful, the two parties, i.e. the head-end on one side and the security module on the other, share a common session key used to protect future communications.

Figure 3:
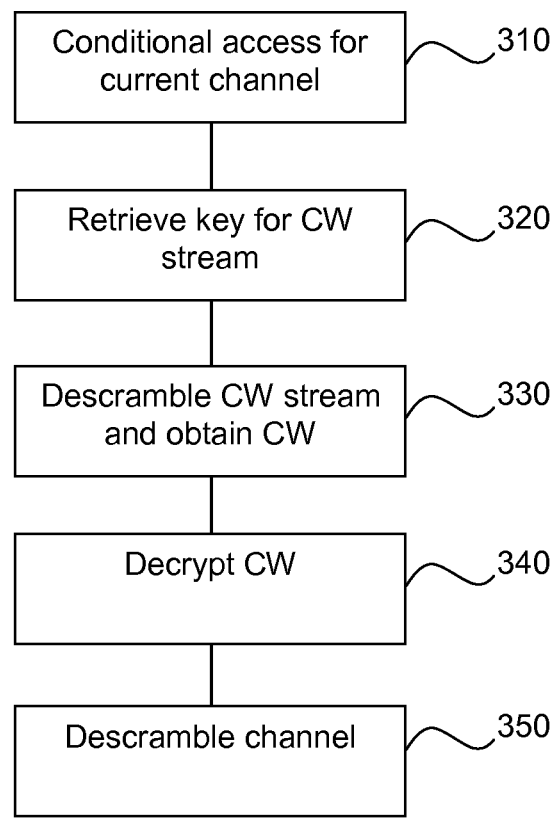
FIG. 3 illustrates a flow chart for a preferred embodiment of a method for conditional access processing at a receiver according to the invention.

FIG. 3 illustrates a flow chart for a preferred embodiment of a method for conditional access processing at a receiver according to the invention. In normal prior art operation, the STB has established a SAC with the security module, in particular if the security module is a removable smart card. The STB searches for an ECM for the current channel. When found, the ECM is passed to the security module that, if the corresponding channel is subscribed to, obtains at least one control word and returns this to the STB over the SAC. The STB then uses the control word to descramble the channel. The STB repeats this operation, step 310, at each change of crypto-period.

As already mentioned, the present invention proposes a solution to reduce the CA delay when switching channels. In order to allow this, the head-end provides a multicast channel—a CW (control word) stream—dedicated to control words of some, preferably all, of the channels that are provided. The STB preferably connects to this multicast channel as soon as possible so as to avoid any delays when this channel is needed.

The CW stream preferably comprises for each chosen channel:

Information identifying the channel,

A control word for the channel. While the control word may be sent in the clear, it is encrypted in the preferred embodiment. The encryption is performed using a channel key that preferably is random and further specific to the channel or the bouquet (i.e. a group of channels). The encryption algorithm may be any suitable algorithm such as e.g. a simple XOR between the control word and the channel key.

Synchronization information, e.g. a parity bit, enabling a receiver to know to what part of the content of the channel the control word applies.

The CW stream is advantageously carried in a standard MPEG2-TS stream, but it will be appreciated that the transmission technology is beyond the scope of the present invention. The CW stream is preferably protected, e.g. by scrambling using a further control word (a stream key), $K_{FCC}$. The further control word is advantageously transmitted to the STBs in a further ECM ($ECM_{CWS}$) in the CW stream, in one or more content channels, or in both the CW stream and in one or more content channels. Naturally, the $K_{FCC}$ may be changed at regular intervals with a crypto-period that may be equal to or different to that of at least one channel, and the $ECM_{CWS}$ may comprise one or more further control words. This results in a super-encryption of the CW in the preferred embodiment since the CW is first encrypted with the channel key and then inserted in the ECM that is itself encrypted using $K_{FCC}$.

At the receiver end, the STB searches 320 in parallel for an ECM for the CW stream, i.e. the STB searches for an $ECM_{CWS}$. When found, the $ECM_{CWS}$ is passed to the security module that, after the usual verifications, decrypts the $ECM_{CWS}$, retrieves the $K_{FCC}$ and returns it to the STB over the SAC.

It should be noted that the present invention, using standard crypto-periods of 10 seconds, requires the verification and decryption by the security module of two ECMs. This will typically take around a single second, which means that there is ample time to do this for each crypto-period.

Upon channel change, the STB uses the further control word $K_{FCC}$ to descramble 330 the CW stream to obtain, using the accompanying information, the control word for the new channel, which is then used to descramble 350 the new channel. As no communication with the security module or any processing in the security module is needed, the recovery is much quicker than finding the ECM for the new channel in the stream for the channel itself. In addition, it will be appreciated that the CW stream may be decrypted before the channel change, e.g. if it is continually decrypted, which further speeds up the process. A possible alternative to the continual decryption of the CW stream is to use techniques that are used to improve trick modes implementation, based for example on the solution described in European patent application EP 1447983. For instance, instead of recording in a table the ECM relevant to the right I-Frame, one records in a table the location in the stream of each control word of each channel. This allows the decoder to recover faster to needed control word.

The STB may then retrieve further ECMs for the new channel in the channel stream itself (if this option is provided) and the also the $ECM_{CWS}$.

As already mentioned, the control words in the CW stream are preferably super-encrypted with channel keys that advantageously are different for each channel or each bouquet. The channel keys are delivered to receivers beforehand, for example in dedicated messages, but preferably in conditional access messages (such as ECMs and EMMs) corresponding to the channels and/or bouquets. As the security module is only able to decrypt conditional access messages that it has access to, it can be ensured that the retrieved channel keys are for channels to which the access rights are available. The security module provides the retrieved channel keys, i.e. at least some, preferably all, of the channel keys for the channels to which the security module has access rights. The skilled person will appreciate that this provision may be performed at a number of different occasions depending on the chosen implementation, such as for example after each reception of an $ECM_{CWS}$, once a month (after reception of a monthly EMM containing the channel keys, the EMM being destined for and decryptable by a single user), or at the set-up or renewal of the SAC between the STB and the security module.

In the preferred embodiment, at channel change (or before) the STB retrieves the control word for the new channel as in the general example given above, an exception being that the retrieved control word is super-encrypted. In case the new channel is a channel to which the user (i.e. the security module) does not have the access rights, then the STB is not able to obtain the channel key and hence it cannot obtain the control word to descramble the channel. On the other hand, in case the user does have access rights to the channel, then it either already has the corresponding channel key or is able to obtain it. Using the channel key, the STB descrambles the super-encrypted control word 340 and then uses the obtained control word to descramble 350 the content.

Figure 4:
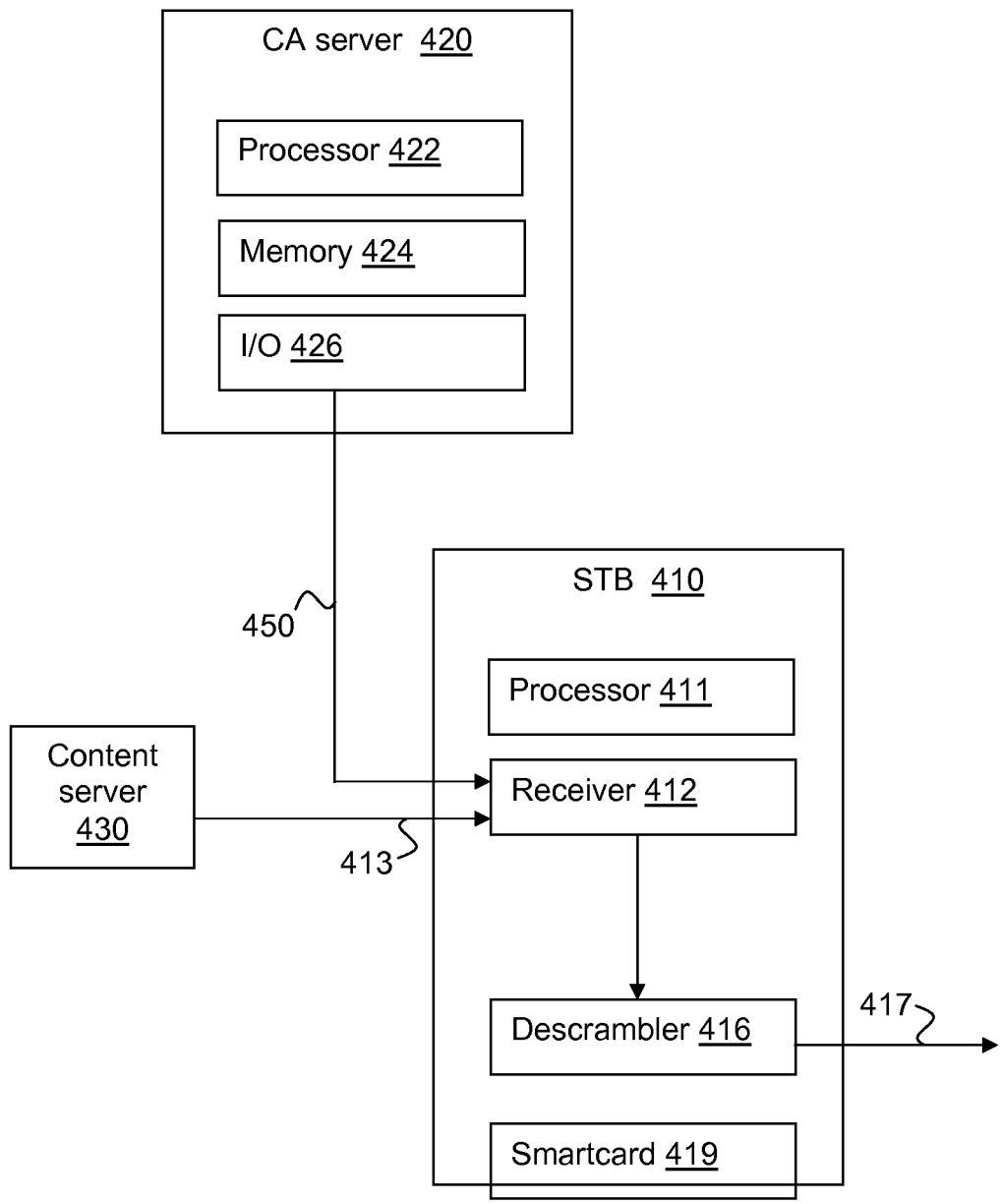
FIG. 4 illustrates a system for transfer of CA data according to a preferred embodiment of the invention.

FIG. 4 illustrates a system for transfer of CA data from a server 420 to a receiver device (exemplified by STB 410) according to a preferred embodiment of the invention. For the sake of clarity, internal connexions are not illustrated and only one STB is illustrated, but it will be appreciated that the server 420 is normally connected to and interacts with a plurality of STBs.

The STB 410 comprises at least one processor 411 (hereinafter "processor"), at least one interface 412 (hereinafter "interface") adapted to receive at least one program from a content server 430 over a first connexion 413 and, if necessary, to forward the program to a descrambler 416 that is adapted to descramble scrambled programs and output the descrambled program, for example to a display device (not shown), on a second connexion 417. In the preferred embodiment, the interface 412 is further adapted to receive ECMs over the first connexion 413 and to forward the ECMs to a security module, such as a preferred smartcard 419, for decryption.

The interface 412 is further adapted to receive a CW stream from a conditional access (CA) server 420 over a third connexion 450. It will be appreciated that at least the first connexion 413 and the third connexion 450 may be implemented at least partly as a single physical connexion. It will also be appreciated that the content server 430 and the CA server 420 may be co-located.

The STB may further comprise a memory (not shown) for storing information about the present subscriptions, but it will be appreciated that this information advantageously is stored, at least initially, in the smartcard 419. The smartcard 419 is also advantageously adapted to set up a SAC with the server 420 and with the STB 410, and to send control words of decrypted ECMs to the descrambler 316.

The smartcard 419 is further adapted to decrypt ECMs, advantageously both for the present channel and for the CW stream, and to send the control words to the processor 411. The processor 411 is adapted to use the received control words to decrypt the present channel and the CW stream.

In the preferred embodiment (with control words encrypted using a channel key in the CW stream), the smartcard 419 is adapted to obtain the channel keys and to forward them to the processor 411, as already described. The processor 411 is adapted to use the channel keys to decrypt at least one encrypted control word, possibly only upon a channel change. In the latter case, the processor 411 is also adapted to send this decrypted control word to the descrambler 416.

The CA server 420 comprises a processor 422 for sending, via a communication unit (I/O) 426, a scrambled CW stream to one or more STBs in. It will be appreciated that the CA server 420 may super-encrypt the control words in the CW stream using a channel key. The CA server 420 further comprises a memory 424 for storing channel keys, control words and other necessary information.

In a second embodiment, no separate CW stream is used. Instead, each channel carries its own control words and at least some, preferably all, of the control words for the other channels. These other channels could be limited to the channels of one or more bouquets, but could also comprise further channels. In the second embodiment, it is preferred that the control word for the channel itself is sent in an ECM and that the control words for the other channels are sent in one or more separate ECMs. It will be appreciated that it is preferred to keep the number of separate ECMs low so as to keep the total number of ECMs to treat to a minimum; it is important to ensure that the control words are ready for the start of the next crypto-period. The control words are preferably super-encrypted, as described hereinbefore.

In a variant, the control words for the other channels are only encrypted with the channel keys (i.e. there is no encryption with the FCC key). In this variant, there is no need for an ECM dedicated to the control word protection and channel keys are delivered in one or more ECMs, one or more EMMs, or a combination thereof, it can be ensured that the decoder may not access channels that it is not authorized to access. In other words, apart from "clear" channels, a decoder may only access the channels that correspond to the user's subscription(s).

It will be appreciated that it in certain circumstances is desired that the CA server 420 deliver unencrypted control words in the CW stream. This may for example be done for certain programs that are to be available to all subscribers, for example as a sort of preview of a channel. The decision is made at the server side.

The person skilled in the art will appreciate that the use of an $ECM_{CWS}$ to transport the further control word to the security module from where it is forwarded to the STB through the SAC is equivalent to a direct SAC from the head-end to the STB. The skilled person will also appreciate that the use of the for example the expressions ECM and EMM is not intended to limit the interpretation to such message; rather a large interpretation is reserved, for instance ECM is intended to cover any message that transports a decryption (or descrambling) key. It will also be appreciated that the term head-end may comprise a plurality of devices that act together to ensure content delivery, such as for example a conditional access server and a plurality of content servers.

It will thus be appreciated that the present invention provides a solution for delivery of CA data that can decrease or remove the CA delay at channel change in a conditional access television system.

Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference signs appearing in the claims are by way of illustration only and shall have no limiting effect on the scope of the claims.

The invention claimed is:

1. A method for receiving control words, each control word being usable to decrypt a separate content channel, the method comprising at a receiver:
    receiving a plurality of broadcast channels comprising one or more content channels and a stream of control words on a channel distinct from the one or more content channels, the stream of control words being encrypted using a stream key, and the distinct channel for the stream of control words being received together with the one or more content channels; and
    decrypting the stream of control words using the stream key to obtain the control words.

2. The method of claim 1, wherein a control word of the stream of control words is further encrypted using a channel key, the channel key being specific to a content channel of the one or more content channels that the control word can decrypt or to a bouquet to which the content channel belongs, the method further comprising decrypting the control word using the channel key.

3. The method of claim 2, further comprising:
receiving the channel key in a message, which may be decrypted only if the receiver has a subscription to the content channel or the bouquet; and
decrypting the message to obtain the channel key.

4. The method of claim 2, further comprising:
receiving the channel key in a message destined for and decryptable only by a specific user; and
decrypting the message to obtain the channel key.

5. The method of claim 1, wherein the stream key for a content channel of the one or more content channels that the receiver accesses is retrieved from an Entitlement Control Message delivered in the content channel or the stream of control words.

6. A device configured to receive control words, each control word being usable to decrypt a separate content channel, the device comprising:
a receiver configured to receive a plurality of broadcast channels comprising one or more content channels and a stream of control words on a channel distinct from the one or more content channels, the stream of control words being encrypted using a stream key, and the distinct channel for the stream of control words being received together with the one or more content channels; and
a decryption unit configured to decrypt the stream of control words using the stream key to obtain the control words.

7. The device of claim 6, wherein a control word of the stream of control words is further encrypted using a channel key, the channel key being specific to a content channel of the one or more content channels that the control word can decrypt or to a bouquet to which the content channel belongs, the decryption unit further configured to decrypt the control word using the channel key.

8. The device of claim 7, wherein:
the receiver further receives the channel key in a message, which may be decrypted only if the receiver has a subscription to the content channel or the bouquet; and
the decryption unit further decrypts the message to obtain the channel key.

9. The device of claim 7, wherein:
the receiver further receives the channel key in a message destined for and decryptable only by a specific user; and
the decryption unit further decrypts the message to obtain the channel key.

10. A device configured to transmit control words, each control word being usable to decrypt a separate content channel of a plurality of content channels, the device comprising:
a processor configured to encrypt a stream of control words using a stream key; and
an interface configured to transmit the encrypted stream of control words, the stream of control words being transmitted on a channel that is distinct from the plurality of content channels, the encrypted stream of control words being transmitted by broadcasting the distinct channel for the encrypted stream of control words together with the plurality of content channels.

11. The device of claim 10, wherein a control word of the stream of control words is further encrypted using a channel key, the channel key being specific to a content channel of the plurality of content channels that the control word can decrypt or to a bouquet to which the content channel belongs.

* * * * *